(12) United States Patent
Yang et al.

(10) Patent No.: US 8,314,984 B2
(45) Date of Patent: Nov. 20, 2012

(54) METHOD AND SYSTEM FOR OPTICAL MEMS WITH FLEXIBLE LANDING STRUCTURES

(75) Inventors: Xiao Yang, Cupertino, CA (US); Ye Wang, Cupertino, CA (US); Yuxiang Wang, Palo Alto, CA (US); Justin Payne, San Jose, CA (US); Wook Ji, San Jose, CA (US)

(73) Assignee: Miradia Inc., Santa Clara, CA (US)

( * ) Notice: Subject to any disclaimer, the term of this patent is extended or adjusted under 35 U.S.C. 154(b) by 874 days.

(21) Appl. No.: 12/031,388

(22) Filed: Feb. 14, 2008

(65) Prior Publication Data
US 2009/0231671 A1   Sep. 17, 2009

(51) Int. Cl.
*G02B 26/08* (2006.01)
(52) U.S. Cl. .................................. 359/224.1; 359/290
(58) Field of Classification Search .... 359/198.1–199.4, 359/200.6–200.8, 202.1, 221.2, 223.1–225.1, 359/226.2, 290–295, 838, 846, 871, 872; 250/204, 559.06, 559.29, 230, 234; 347/255–260; 353/39, 98–99; 385/15–18, 22; 398/12, 398/19, 45
See application file for complete search history.

(56) References Cited

U.S. PATENT DOCUMENTS

| | | | |
|---|---|---|---|
| 5,447,660 A | 9/1995 | Chau | |
| 5,914,802 A | 6/1999 | Stappaerts et al. | |
| 6,900,922 B2 | 5/2005 | Aubuchon | |
| 6,914,711 B2 | 7/2005 | Novotny et al. | |
| 7,034,984 B2 | 4/2006 | Pan et al. | |
| 7,139,113 B1 | 11/2006 | Chu et al. | |
| 7,167,298 B2 | 1/2007 | Pan | |
| 7,172,296 B2 | 2/2007 | Huibers | |
| 7,209,274 B2 | 4/2007 | Van Drieenhuizen et al. | |
| 7,215,459 B2 | 5/2007 | Huibers et al. | |
| 7,245,416 B2 | 7/2007 | Pan et al. | |
| 7,252,395 B2 | 8/2007 | DiCarlo et al. | |
| 7,262,817 B2 | 8/2007 | Huibers | |
| 7,265,477 B2 | 9/2007 | Wan | |

(Continued)

FOREIGN PATENT DOCUMENTS

JP   2004-354440   12/2004

OTHER PUBLICATIONS

International Search Report and Written Opinion of PCT Application No. PCT/US09/33942, mailed Mar. 26, 2009, 10 pages total.

*Primary Examiner* — Jennifer L. Doak
(74) *Attorney, Agent, or Firm* — Kilpatrick Townsend & Stockton LLP

(57) ABSTRACT

An optical deflection device for a display application includes a semiconductor substrate comprising an upper surface region defining an upper surface plane. The optical deflection device also includes one or more electrode devices provided overlying the upper surface region and a hinge device including a silicon material and coupled to the upper surface region at a predetermined height above the upper surface plane. The optical deflection device further comprises a plurality of landing pads including a silicon material and coupled to the upper surface region at the predetermined height from the upper surface plane and a mirror structure. The mirror structure includes a post portion coupled to the hinge device and a mirror plate portion coupled to the post portion.

17 Claims, 11 Drawing Sheets

U.S. PATENT DOCUMENTS

| | | |
|---|---|---|
| 7,307,777 B2 | 12/2007 | Pan |
| 2005/0030490 A1 | 2/2005 | Huibers |
| 2005/0128564 A1 | 6/2005 | Pan et al. |
| 2005/0134956 A1 | 6/2005 | Mangrum et al. |
| 2005/0157373 A1 | 7/2005 | Aubuchon |
| 2005/0157375 A1 | 7/2005 | Doan et al. |
| 2005/0179973 A1 | 8/2005 | Nanjyo et al. |
| 2005/0185250 A1 | 8/2005 | Novotny et al. |
| 2005/0206993 A1 | 9/2005 | Doan et al. |
| 2005/0213190 A1 | 9/2005 | Patel et al. |
| 2005/0224449 A1 | 10/2005 | Hsieh et al. |
| 2007/0091414 A1 | 4/2007 | Yang |
| 2007/0097487 A1 | 5/2007 | Yang et al. |
| 2007/0127110 A1 | 6/2007 | Pan |

METHOD AND SYSTEM FOR OPTICAL MEMS WITH FLEXIBLE LANDING STRUCTURES

BACKGROUND OF THE INVENTION

This present invention relates generally to optical systems. More particularly, the invention relates to a method and structure for an optical micro-electromechanical systems (MEMS) including a flexible landing structure configured to support a reflective surface. Merely by way of example, the invention has been applied to the structure of a spatial light modulator with a high fill ratio and antistiction features. The method and device can be applied to spatial light modulators as well as other devices, for example, micro-electromechanical sensors, detectors, and displays.

Spatial light modulators (SLMs) have numerous applications in the areas of optical information processing, projection displays, video and graphics monitors, televisions, and electrophotographic printing. Reflective SLMs are devices that modulate incident light in a spatial pattern to reflect an image corresponding to an electrical or optical input. The incident light may be modulated in phase, intensity, polarization, or deflection direction. A reflective SLM is typically comprised of an area or two-dimensional array of addressable picture elements (pixels) capable of reflecting incident light.

Some conventional SLMs utilize array designs that include an array of micro-mirrors with a set of electrodes and a memory array positioned underneath each of the micro-mirrors. For display applications, the micro-mirrors are generally fabricated using semiconductor processing techniques to provide devices with dimensions on the order of 10 μm×10 μm. Using such small mirrors enables display applications to use SLMs in applications characterized by increased image resolution for a given display size. Merely by way of example, HDTV systems, with a resolution of 1,080 scan lines×1,920 pixels/line, are currently available to consumers.

One of the concerns related to the micro-mirrors used in reflective MEMS-based SLMs is stiction between the micro-mirrors and surfaces with which the micro-mirrors may come in contact. An example of such surfaces would be landing structures or other mechanical stops that support portions of the micro-mirror in an activated state. Surface forces acting between the micro-mirrors and the landing structures, for example, are sometimes referred to as "stiction" forces, since in some MEMS, parasitic forces arise from a combination of MEMS components sticking together and from friction, thus the term stiction. These parasitic forces may be strong enough to overcome the restoring force provided by spring-like elements of the MEMS, resulting in an undesirable adhesion of the micro-mirror to the landing structures.

Additionally, some optical MEMS designs utilize a solid structure, for example, a solid post, as a mechanical stop to arrest the rotation of the micro-mirror in an activated state. Repeated contact between the micro-mirror and such a solid landing structure may result in wear and tear at the contacting surfaces, degrading device performance and reliability over time. As an example, deterioration of surfaces at the contact region between the micro-mirrors and the landing structures may result in surface non-uniformity, thereby further increasing the stiction forces.

Adhesion of the micro-mirror to the landing structure will adversely impact long-term reliability of the optical MEMS. For example, failure of a single micro-mirror to release from the activated position may cause a pixel of the display to become permanently dark or bright, depending on the optical design. Thus, there is a need in the art for methods and systems to reduce stiction forces present in optical MEMS.

SUMMARY OF THE INVENTION

According to the present invention, techniques for optical systems are provided. More particularly, the invention relates to a method and structure for an optical micro-electromechanical systems (MEMS) including a flexible landing structure configured to support a reflective surface. Merely by way of example, the invention has been applied to the structure of a spatial light modulator with a high fill ratio and antistiction features. The method and device can be applied to spatial light modulators as well as other devices, for example, micro-electromechanical sensors, detectors, and displays.

According to an embodiment of the present invention, an optical deflection device for a display application is provided. The optical deflection device includes a semiconductor substrate comprising an upper surface region defining an upper surface plane and one or more electrode devices provided overlying the upper surface region. The optical deflection device also includes a hinge device comprising a silicon material and coupled to the upper surface region at a predetermined height above the upper surface plane and a plurality of landing pads comprising a silicon material and coupled to the upper surface region at the predetermined height from the upper surface plane. The optical deflection device further includes a mirror structure including a post portion coupled to the hinge device and a mirror plate portion coupled to the post portion.

According to another embodiment of the present invention, an array of optical deflection devices for a display application is provided. The array of optical deflection devices includes a semiconductor substrate comprising an upper surface region defining an upper surface plane and a plurality of sets of electrode devices arrayed over the upper surface region. The array of optical deflection devices also includes a plurality of hinge devices. Each of the plurality of hinge devices is associated with a set of electrode devices. Also, each of the plurality of hinge devices includes a silicon material coupled to the upper surface region and positioned at a predetermined height above the upper surface plane. The array of optical deflection devices further includes a plurality of mirror structures. Each of the plurality of mirror structures are joined to one of the plurality of hinge devices. Also, each of the plurality of mirror structures includes a mirror anchor portion coupled to the one of the plurality of hinge devices and a mirror plate portion coupled to the mirror anchor portion. Moreover, the array of optical deflection devices includes a plurality of sets of landing pads, each of the sets of landing pads being associated with one of the plurality of mirror structures. Each of the sets of landing pads comprises a silicon material coupled to the upper surface region at the predetermined height from the upper surface region.

According to an alternative embodiment of the present invention a method of fabricating an optical deflection device is provided. The method includes providing a substrate, forming a planarized dielectric layer over the substrate, and forming a plurality of cavities in the planarized dielectric layer. The method also includes performing a layer transfer process to bond a silicon layer to the planarized dielectric layer, forming a hinge and a plurality of landing pads from the silicon layer, and forming a substantially planarized material layer coupled to the hinge. The method further includes forming a mirror anchor cavity in the substantially planarized material layer, forming a mirror structure filling at least a portion of the mirror anchor cavity, and releasing the mirror structure.

Numerous benefits are achieved using the present invention over conventional techniques. For example, in an embodiment according to the present invention, an array of micro-mirrors with a high fill ratio is provided. Utilizing a flexible single crystal silicon landing structure, long-term reliability is provided. Moreover, embodiments of the present invention utilize an all silicon mirror and hinge structure that can operate at higher temperatures as a result of matching the coefficient of thermal expansion of the mirror and hinge. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

DETAILED DESCRIPTION OF SPECIFIC EMBODIMENTS

Figure 1A:
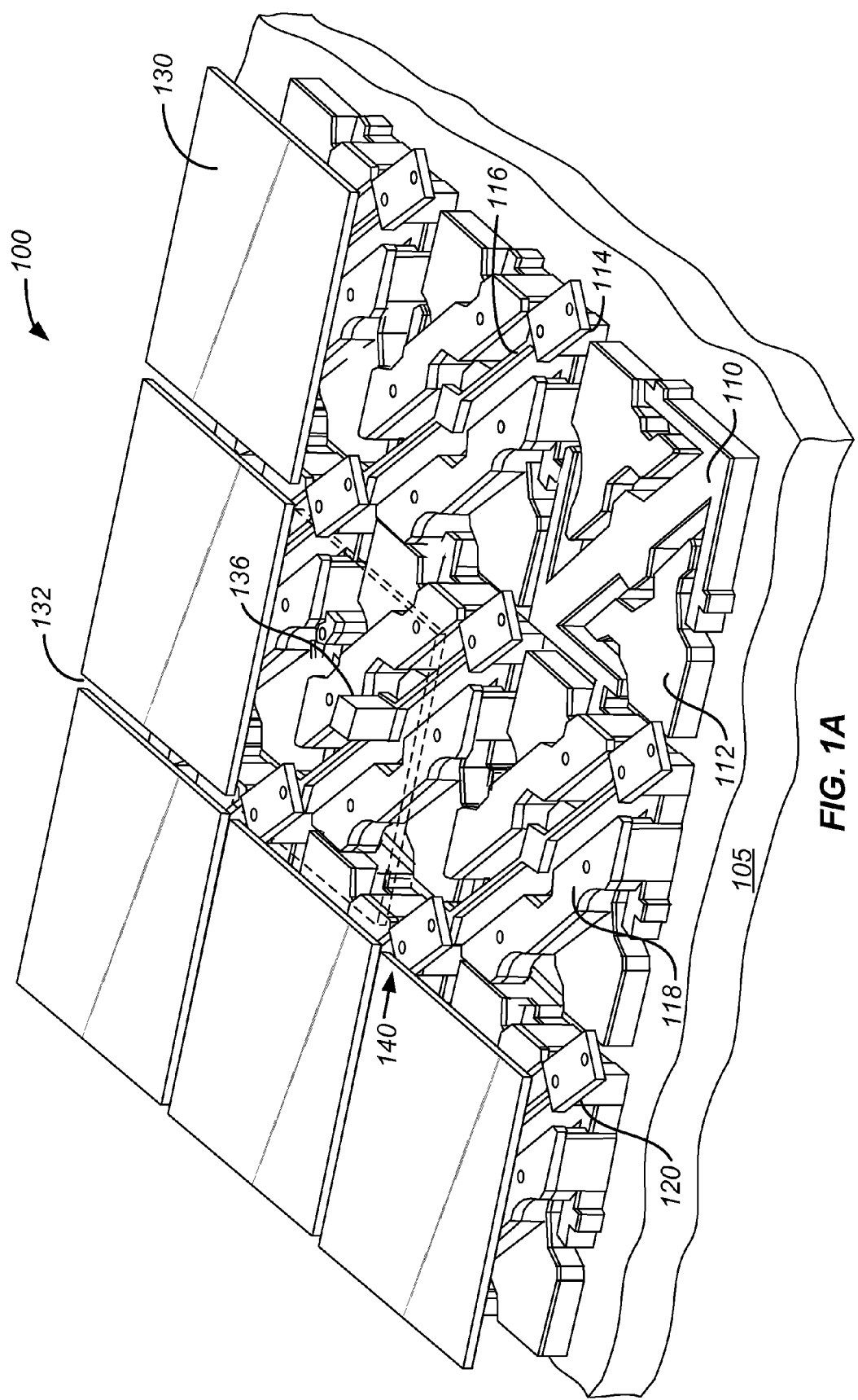
FIG. 1A is a simplified cutaway perspective view of an array of SLMs according to an embodiment of the present invention.

FIG. 1A is a simplified cutaway perspective view of an array of SLMs according to an embodiment of the present invention. As illustrated, this cutaway view is merely representative of the array of SLMs at various stages of processing. As described more fully below, independent control of the SLMs in an array is utilized in embodiments according to the present invention to form images in display applications and other apparatus.

As illustrated in FIG. 1A, the array of SLMs 100 is mounted on a support substrate 105. In some embodiments, the support substrate is a silicon substrate with CMOS control circuitry fabricated using semiconductor processing techniques. Multi-level electrodes 112/118 are coupled to the support substrate 105. As illustrated in FIG. 1A, the multi-level electrodes comprise two complementary electrodes positioned on opposite sides of a flexible member 116 coupled to a standoff structure 114. As described more fully below, in an embodiment, drive voltages are provided to the complementary electrodes, providing electrostatic attraction forces acting on the micro-mirror plates 130.

In operation, the individual reflective elements or pixels making up an array of micro-mirrors in an SLM are selectively deflected, thereby serving to spatially modulate light that is incident on and reflected by the micro-mirrors in the SLM. The spacing 132 between adjacent micro-mirrors is on the order of less than a micron. In a specific embodiment, the spacing 132 is about 0.6 μm with micro-mirrors having a pitch of 10.8 μm. In other embodiments, the spacing 132 is less than or equal to about 0.6 μm with micro-mirrors having a pitch of less than or equal to about 10.8 μm. In order to deflect the micro-mirrors, voltages are applied to the complementary electrodes and the mirror plate to cause the mirror to rotate about the torsion spring hinge 116. As will be evident to one of skill in the art, the pixels are adapted to rotate in both clockwise and counter-clockwise directions depending on the particular electrode voltages. When the voltages are removed, the torque present in hinge 116 causes the mirror plate 130 to return to the unactivated position illustrated in FIG. 1A. In the particular embodiment shown in FIG. 1A, flexible landing structures 120 are utilized to arrest the motion of the micro-mirror in the clockwise and counter-clockwise directions.

FIG. 1A illustrates an embodiment of the present invention in which the complementary electrodes are multi-level electrodes 112/118 with raised central portions adjacent the center of the micro-mirror plates. Such multi-level electrodes reduce the distance between the top of the electrode surface and the micro-mirror plates, thereby decreasing the magnitude of the addressing voltages used to actuate the micro-mirror plates. However, embodiments of the present invention are not limited to multi-level electrodes. In alternative embodiments, other electrode geometries are utilized. One of ordinary skill in the art would recognize many variations, modifications, and alternatives.

As illustrated in FIG. 1A, each micro-mirror plate 130 is coupled to the support substrate 105 by mirror post 136, a torsion spring hinge 116, and standoff structure 114. Referring to one of the micro-mirrors 130, upon actuation of the electrodes, the micro-mirror plate rotates in a plane orthogonal to the longitudinal axis of the torsion spring hinge. In some embodiments, the longitudinal axis of the torsion spring hinge is parallel to a diagonal of the micro-mirror plate. The motion of the micro-mirror is arrested by contact between and end portion 140 of the micro-mirror plate and the flexible landing structures 120. In order to provide two actuated positions, complementary sets of landing structures are provided on opposite sides of the torsion spring hinge 116. Although the flexible landing structures or landing pads 120 are illustrated in FIG. 1A as extending to a greater height from the substrate than the torsion spring hinge, this is not required by the present invention. In some embodiments, the landing structures and the torsion spring hinge are fabricated from the same material layer, thereby being spaced from the substrate by the same distance. In other embodiments, one or more layers are formed on the landing pads, which increases the height of the landing pads with respect to the torsion spring hinges. One of ordinary skill in the art would recognize many variations, modifications, and alternatives.

According to embodiments of the present invention, the micro-mirrors are tilted at predetermined angles in the actuated states, providing for controlled reflection of incident radiation. In a particular embodiment, the predetermined angles are about ±15°. In other embodiments, the predetermined angles are less than ±15° or more than ±15°, depending on the particular applications. Moreover, the predetermined tilt angles need not be symmetric, but may be different. One of ordinary skill in the art would recognize many variations, modifications, and alternatives.

As described more fully throughout the present specification, the support substrate 105, the standoff structures 114, and the torsion spring hinges 116 are joined using a substrate bonding process according to some embodiments of the present invention. In other embodiments, these structures are fabricated using a combination of deposition, patterning, etching, wafer bonding, and other semiconductor processing techniques. In some embodiments, reflective surfaces are formed on the micro-mirror plates 130, providing an array of SLMs with hidden hinges. For purposes of clarity, the spacing between adjacent micro-mirrors is illustrated in FIG. 1A as a significant fraction of the mirror dimensions. As will be evident to one of skill in the art, reductions in the space between mirrors will result in an increased fill ratio and improved image quality in display applications. The spacing between adjacent micro-mirrors is generally defined using photolithographic processes, providing high fill ratio designs. Additional details related to the structures and fabrication of integrated standoff structures and multi-level electrodes are described in U.S. patent application Ser. No. 11/250,320, entitled "Spatial Light Modulator With Multi-Layer Landing Structures," filed Oct. 13, 2005, and U.S. patent application Ser. No. 11/448,149, entitled "High Fill Ratio Silicon Spatial Light Modulator," filed Jun. 5, 2006, both of which are commonly assigned, and hereby incorporated by reference for all purposes.

Figure 1B:
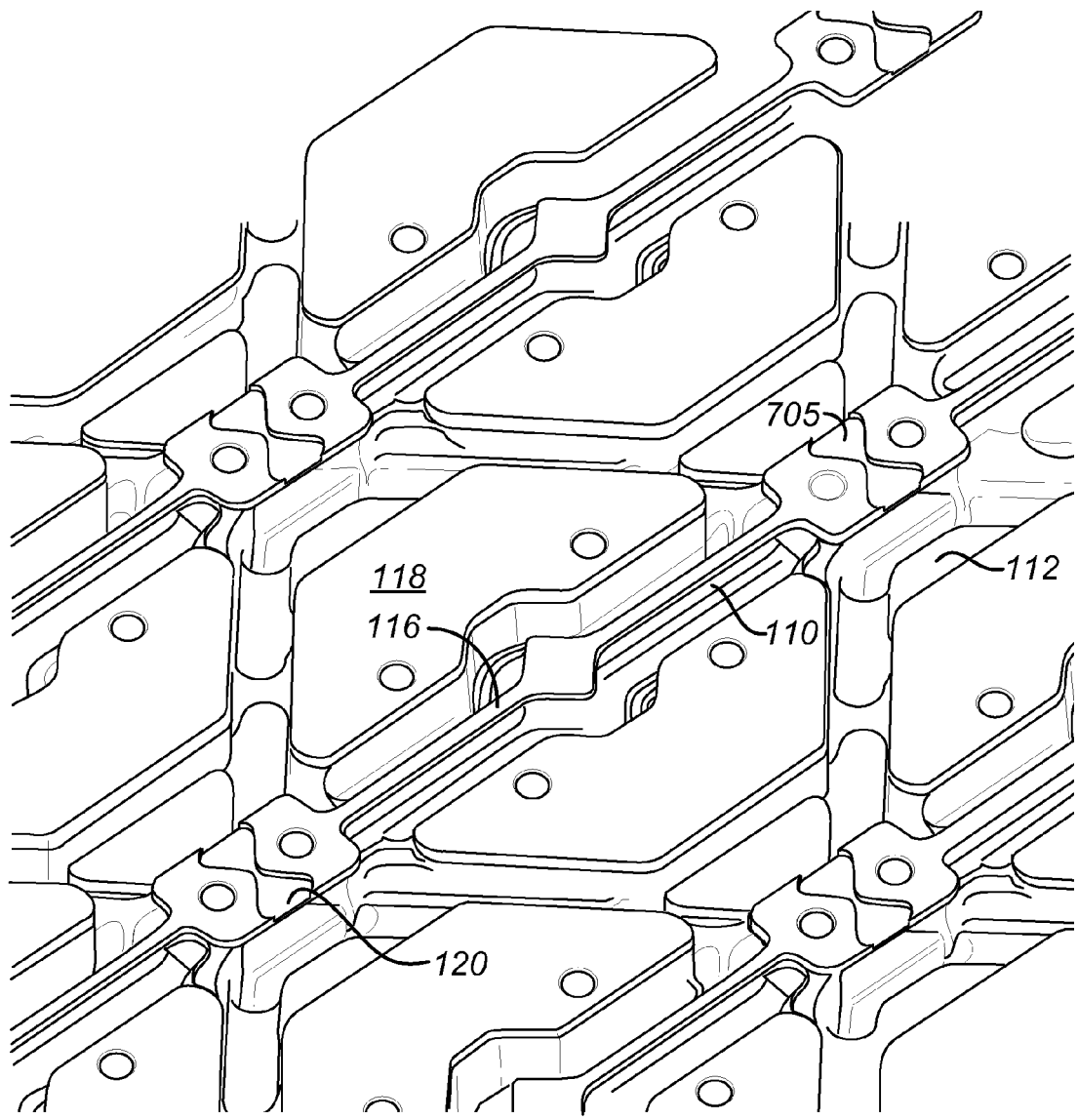
FIG. 1B is a simplified perspective view of a SLM at an intermediate stage of the fabrication process.

FIG. 1B is a simplified perspective view of a SLM at an intermediate stage of the fabrication process. In the embodiment illustrated in FIG. 1B, multi-level electrodes 112/118 are shown with the upper electrode 118 covering a majority of the lower electrode 112. The dimensions of the lower and upper electrodes are selected to provide for clearance for the mirror during rotation along with decreased operating voltage. Moreover, in the embodiment illustrated in FIG. 1B, portions of the torsion spring hinges, the landing structures, and the upper electrode are coplanar.

The torsion spring hinge 116 is separated from bias line 110 in order to provide the torsion spring hinge with a space to move during actuation. The flexible landing structures 120 include a clear out zone 705 as described in more detail with respect to FIG. 7A. The thickness and geometry of the landing structures is selected to provide for flexible motion toward the substrate in response to contact with the mirror plate. The hour glass shape of clear out zone 705 is merely provided for illustration and is not require by embodiments of the present invention. As shown in FIG. 1B, the upper surface of the landing structures 120 is coplanar with the upper surface of the torsion spring hinges 116. Generally, these upper surfaces include a metal layer that provides for electrical connectivity and a deposition interface for the formation of the mirror post 136 as illustrated in FIG. 1A and described in additional detail throughout the present specification.

Figure 2A:
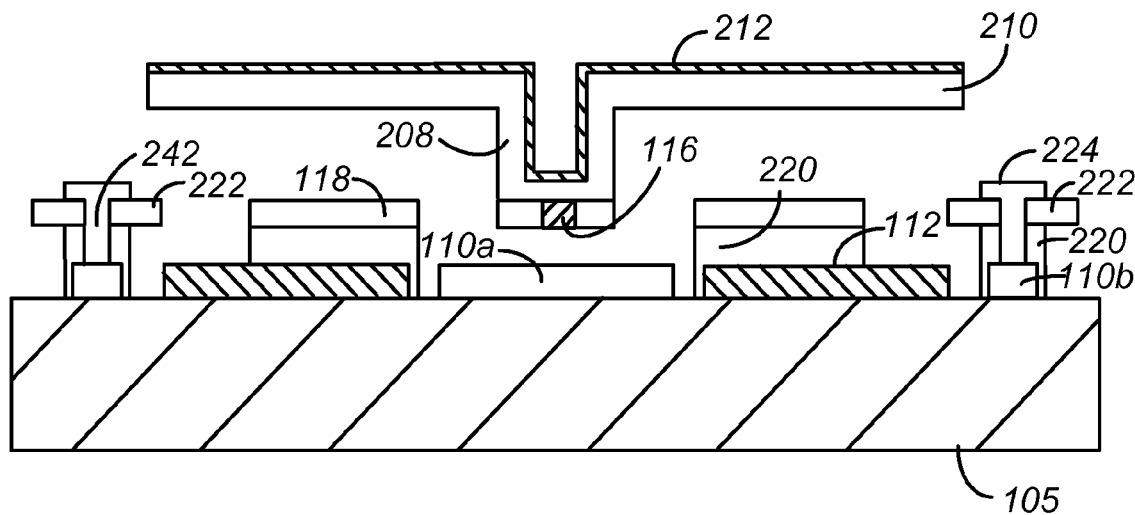
FIGS. 2A-2B illustrate simplified cross-sectional views of a high fill ratio mirror for an SLM according to an embodiment of the present invention.
Figure 2B:
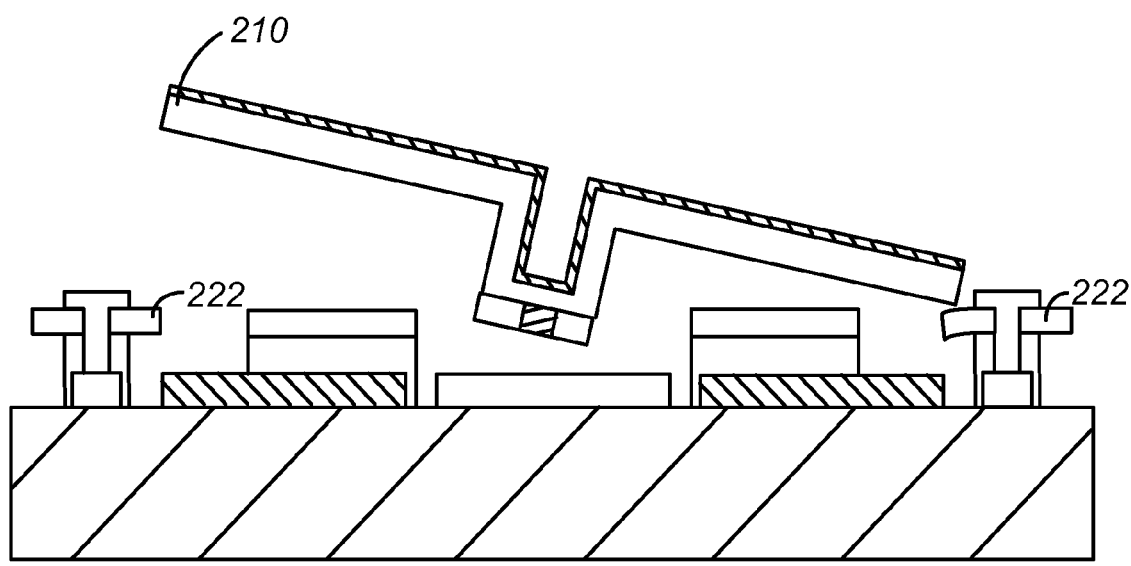

FIGS. 2A-2B illustrate simplified cross-sectional views of a high fill ratio mirror for an SLM according to an embodiment of the present invention. The SLM includes CMOS substrate 105, a bias line 110a and a bias grid 110b. CMOS or device substrate 105 includes a number of layers, of which only a selected few are illustrated in FIGS. 2A-2B. The semiconductor substrate 105 includes an upper surface plane, which is generally defined along the bottoms of bias line 110a and bias grid 110b. Alternatively, the upper surface plane is defined with respect to another layer or region of the CMOS substrate, such as the tops of the bias line 110a.

One layer illustrated in the figures includes multi-level or stepped electrodes 112/118. As will be evident to one of skill in the art, additional metal, insulator, and via layers, as well as other devices, are typically fabricated on substrate 105. In some embodiments of the present invention, these additional layers and devices include CMOS circuitry fabricated in processing steps prior to the formation of the electrodes and utilized to drive the electrodes. In a particular embodiment, these layers, along with one or more layers including portions of the electrodes are fabricated using standard CMOS processes.

Referring to FIG. 2A, landing pads 222 are illustrated at the same level of the structure as the upper portion of the stepped electrodes 118. As described more fully through the present specification and more particularly below with respect to FIG. 2B, the landing pads 222 arrest the rotation of the micro-mirrors in tilted or actuated positions. The SLM also includes bias vias that are filled by a via plug 242. Bottom electrode 112, which is defined as a portion of a metal-4 (M4) layer in some embodiments is separated from a silicon top electrode 118 by an oxide layer 220. Referring to FIG. 2A, the upper portion of the stepped electrode 118 extends toward the corner of the mirror plate, extending the lateral extent of the electrical field generated by the upper electrode 118. The use of a step electrode design enables the hinge to have an increased width in comparison to single level electrode designs, while still operating at lower voltages.

As shown in FIG. 2A, the via plugs 242 provide electrical connection between the bias grid 110b and a single crystal silicon layer from which a single crystal silicon hinge 116, single crystal silicon landing pads 222, and single crystal silicon top electrode 118 are formed. An antireflection (AR) coating 224 is formed on the single crystal silicon layer to provide for reduction of undesirable reflections from locations between adjacent micro-mirrors. Because the landing pads and the hinge layer are fabricated from the same material layer, these features are positioned at the same height above the CMOS substrate and can be referenced to the same upper surface plane of the CMOS substrate.

The micro-mirror structure includes a mirror post 208 and mirror plate 210. The mirror structure as illustrated in FIG. 2A utilizes an amorphous silicon mirror post 208 and mirror plate 210 and a titanium/aluminum (Ti/Al) reflective layer 212 deposited on the mirror plate 210 using physical vapor deposition (PVD). Thus, in some embodiments, the SLM comprises an all silicon mirror structure, although this is not required by the present invention. The mirror structure 208/210 is attached to the torsion spring hinge 116 during the micro-mirror formation process. As illustrated in FIGS. 1 and 2A, embodiments of the present invention provide a micro-mirror characterized by a high fill ratio and a hidden hinge. Since the central section of the mirror is reflective, high optical quality is provided as well as reduction of undesired reflections from outside the mirror area, resulting in high contrast. The use of a single crystal silicon hinge 116 provides SLMs with long-term reliability and the use of an amorphous silicon mirror plate 210 provides mechanical rigidity.

The mirror plate 210 provides a mechanical structure that resist deformation during operation. For example, an amorphous silicon mirror plate is mechanically rigid as appropriate for a structure that impacts landing pads 222 during mirror switching operations. As described more fully throughout the present specification, the materials used in the fabrication of mirror post 208 and mirror plate 210 are not limited to amorphous silicon, but a wide variety of materials may be used. Moreover, because both the mirror and hinge structure are fabricated from silicon, the coefficients of thermal expansion (CTE) are well matched, enabling operation of the SLMs at higher operating temperatures.

During conventional operation of the SLM, the mirror is typically switched between a center or unactivated position and two complementary activated positions with equal and opposite deflection angles. In either of the activated positions, stiction forces present between the lower portions of the mirror plate of the micro-mirror and the landing structures, for example, the landing pads 222 illustrated in FIG. 2A, may prevent the micro-mirror from returning to the center position. As will be evident to one of skill in the art, pixels of a display sticking in such an activated state is undesirable. Accordingly, embodiments of the present invention provide landing pads 222 that bend in response to contact with the micro-mirror in the activated state, providing a restoring force, in addition to the restoring force present in the torsion spring hinges, to overcome stiction forces and free the micro-mirror from sticking in an activated state.

Although a single micro-mirror associated with an SLM is illustrated in various embodiments, the present invention is not limited to a single micro-mirror. Arrays of micro-mirrors suitable for display and other applications are provided according to embodiments of the present invention. Furthermore, although several embodiments refer to particular elements of the SLM, additional elements are included within the scope of the present invention. One of ordinary skill in the art would recognize many variations, modifications, and alternatives.

FIG. 2B illustrates a cross-sectional view of an SLM in an activated position according to an embodiment of the present invention. Single crystal silicon landing pad 222 makes contact with the lower portion of the mirror plate 210 to arrest the rotation of the micro-mirror in the activated position. As illustrated in FIG. 2B, the landing pad 222 deforms in response to contact with the mirror plate, providing for a restoring force opposing stiction forces present at the contact region. As described more fully below, the shape of the landing pads 222 is selected to provide for a desired restoring force, the magnitude of which depends on the particular application. Moreover, the length of the landing pads along the direction of the single crystal silicon layer, the distance from the contact region to the center of the landing pad, and the like, are selected depending on the particular applications. Additionally, as described more fully below, the shape and structure of the landing pads 222 are selected to provide a material of desired flexibility, thereby providing the desired restoring force.

Figure 3A:
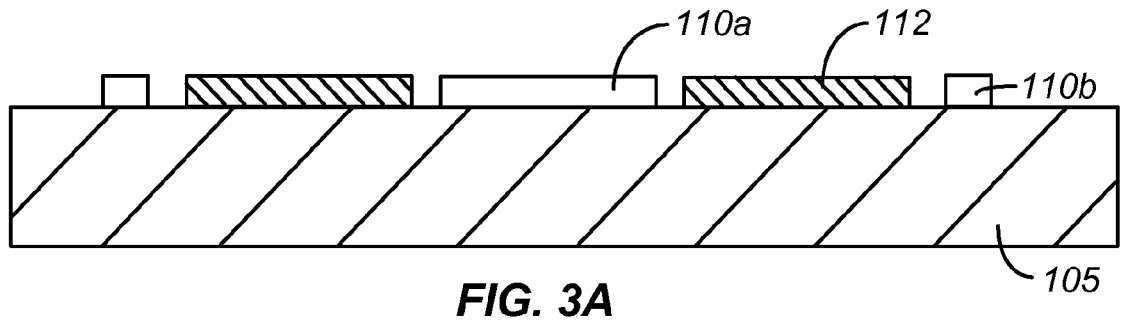
FIGS. 3A-3L illustrate simplified cross-sectional views of a process flow for fabricating an SLM according to an embodiment of the present invention.

FIGS. 3A-3L illustrate simplified cross-sectional views of a process flow for fabricating an SLM according to an embodiment of the present invention. Referring to FIG. 3A, CMOS wafer 105 is illustrated after a via formation process. Bottom electrode layer 112 is formed using a low temperature (e.g., less than 350° C.) PVD metal deposition process. In an embodiment of the present invention, the bottom electrode layer 112 includes a multi-layer metal stack such as 1,000 Å of titanium nitride (TiN), 8,000 Å of aluminum, and another 1,000 Å of TiN. Of course, in alternative embodiments, other suitable materials that conduct electricity and provide mechanical support for additional layers are utilized to form the bottom electrode layer 112. Patterning using photolithography and etching processes are utilized to pattern the bottom electrode layer 112 after deposition. The bias line 110a and the bias grid 110b are also formed during this PVD metal deposition and patterning process.

Thus, although various metal layers defined during the process steps illustrated in FIG. 3A lie in the same vertical plane, they are physically separated so as to operate at different potentials. As described more fully below, various layers are formed during fabrication processes to form the overall electrode and mirror structure. The various materials and processes described below are not intended to limit the scope of the present invention but are merely provided as illustrative examples. One of ordinary skill in the art would recognize many variations, modifications, and alternatives.

Figure 3B:
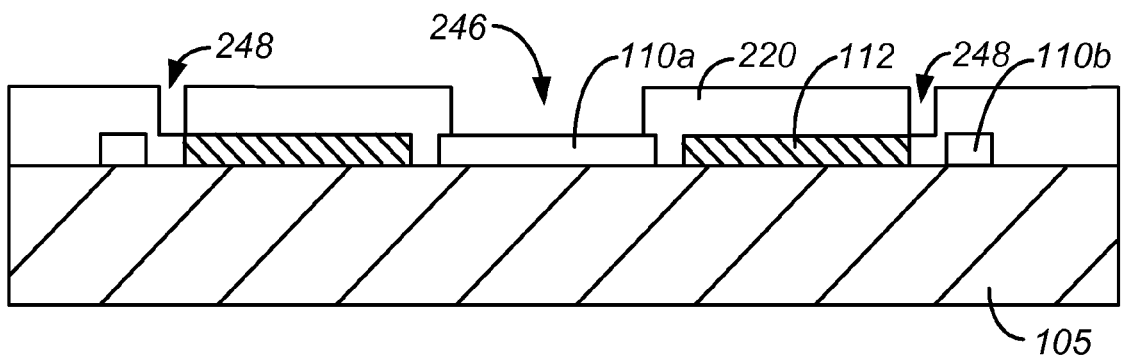

Referring to FIG. 3B, a high density plasma (HDP) insulator deposition, planarization, and patterning process is illustrated. In some embodiments, planarization is accomplished using a chemical mechanical polishing (CMP) process, although this is not required by the present invention. In the embodiment illustrated in FIG. 3B, the layer 220 is an oxide layer deposited using a low temperature (e.g., less than 350° C.) HDP process, although other layers that provide electrical insulation and mechanical support for additional layers are utilized in alternative embodiments. Bias line 110a and bias grid 110b are illustrated as before and are covered by the oxide layer during the deposition process and prior to the patterning process.

In an embodiment, layer 220 is fabricated from silicon oxide ($Si_xO_y$), but this is not required by the present invention. Other suitable materials may be used within the scope of the present invention. For example, layers fabricated from silicon nitride ($Si_xN_y$) are utilized in alternative embodiments. In yet other embodiments, silicon oxynitride (SiON) is used to fabricate layer 220. Moreover, polysilicon material, including amorphous polysilicon, is utilized in yet another alternative embodiment according to the present invention. Combinations of such materials may be used to form a composite layer. Materials with suitable characteristics, including formation of a strong bond with underlying layers, good adhesion to substrate 105, and mechanical rigidity, are acceptable substitutes for $Si_xO_y$ materials.

Moreover, in some embodiments of the present invention, the process used to deposit the layer or layers from which layer 220 is fabricated is performed in light of the structures associated with the device substrate. For example, some CMOS circuitry may be adversely impacted by performing high temperature deposition processes, as these high temperature deposition processes may damage metals (e.g., aluminum reflow) or result in diffusion of junctions associated with the CMOS circuitry. Thus, in a particular embodiment of the present invention, low temperature deposition, patterning, and etching processes, such as processes performed at temperatures of less than 500° C., are used to form layer 220. In another specific embodiment, deposition, patterning, and etching processes performed at less than 400° C., are used to form layer 220.

In a particular embodiment, layer 220, with a first thickness, is deposited on substrate 105. Layer 220 is a silicon dioxide ($SiO_2$) layer in a specific embodiment of the present invention, but as described above, this is not required by the present invention. Other suitable materials may be used within the scope of the present invention. For example, layer 220 is formed by deposition of silicon nitride ($Si_3N_4$), silicon oxynitride (SiON), combinations thereof, and the like in alternative embodiments. Moreover, polysilicon material, including amorphous polysilicon, is deposited to form layer 220 in yet another alternative embodiment according to the present invention.

The deposited layer 220 has a predetermined first thickness as initially deposited. In a specific embodiment, the first thickness is about 2.0 µm. In other embodiments, the first thickness ranges from about 1.0 µm to about 3.0 µm. Of course, the thickness will depend on the particular applications. In some deposition processes, the upper surface of the deposited layer 220 is uniform across the substrate, resulting in a planar surface. However, a planar surface after deposition is not required by the present invention. In a particular deposition process, the patterned nature of the bias layer 110 and electrodes 112 results in the thickness of layer 220 varying as a function of lateral position, producing an upper surface that is not entirely flat.

Figure 3C:
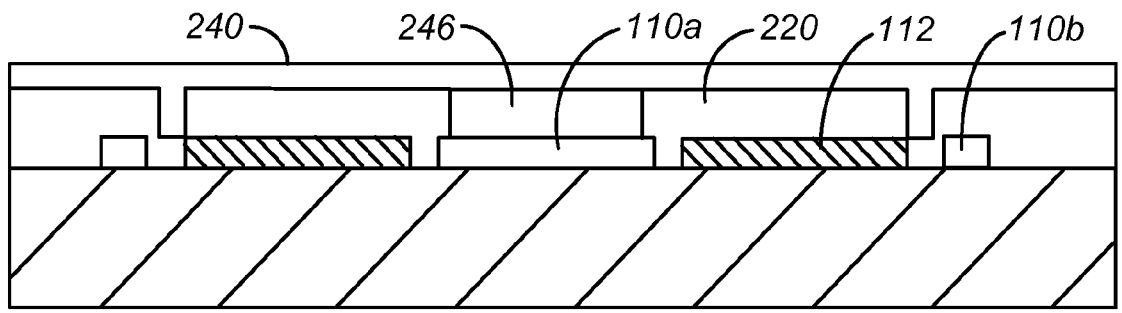

To planarize the upper surface of the deposited layer 220, an optional CMP step is performed in an embodiment of the present invention. The results produced by the CMP process are illustrated by the upper surface of layer 220 as shown in FIG. 3B in which the thickness of layer 220 is a second thickness less than the first thickness. During the CMP process, material is removed, resulting in a highly polished and planarized layer of a second thickness. In a particular embodiment, the root-mean-square (RMS) roughness of the planarized surface is less than or equal to about 4 Å. As will be described below, the extremely smooth surface produced during the CMP process facilitates substrate bonding as shown in FIG. 3C. In embodiments according to the present invention, the second thickness of layer 220 is about 0.8 µm. Alternatively, the second thickness ranges from about 0.5 µm to about 2.5 µm in other embodiments. Of course, the thickness will depend upon the particular applications.

Referring to FIG. 3C, a first cavity 246 and second cavities 248 are formed in layer 220 using a patterning and material removal process, such as etching. The cavity 246 extends from the upper surface of deposited layer 220 to the bias line 110a. The cavities 248 also extend from the upper surface of deposited layer 220 to the top of the electrodes 112. The dimensions of cavity 246 are selected to provide a rotation space for the torsion spring hinge as described more fully below. Additionally, the dimensions of cavities 248 are formed to provide for motion or substantially elastic deformation of the landing pads as described more fully below. In particular, the landing pads will deform or flex in a direction toward the CMOS substrate when in contact with the mirror plate. Although not illustrated in FIG. 3C for purposes of clarity, additional cavities are formed for other mirrors in the array of mirrors provided as part of the SLM.

The cavity 246 is characterized by a volume defined by the depth of the cavity, measured normal to the upper surface of layer 220 and the lateral area of the cavity. According to embodiments of the present invention, the surface area defined by the upper surface of layer 220 is greater than the combined lateral areas of cavities 246 and 248. The greater surface area provided by the upper surface of layer 220 compared to the lateral areas of the cavities facilitates substrate bonding as discussed in relation to FIG. 3C since the bonding area is greater than the unbonded area. In a specific embodiment, the combined lateral areas of the cavities is about 1-2 µm² for every 100 µm² of the surface of layer 220. Thus, the lateral area of the cavity is a few percent of the total original surface area of the upper surface of layer 220 prior to formation of cavities 246 and 248 and the bonding area extends over the majority of the surface area of layer 240. The bonding yield, which is related to the bonding area, is high in embodiments of the present invention as a result of these area ratios.

FIG. 3C illustrates a simplified cross sectional view of the SLM after a substrate bonding process. According to an embodiment, a silicon on insulator (SOI) substrate including single crystal silicon layer 240 is bonded to the substrate illustrated in FIG. 3B using substrate bonding techniques. After the substrates are joined, the insulating and other layers (not shown) of the SOI substrate are removed using lapping, grinding, etching, or other thinning processes, to expose the single crystal silicon layer 240. Additional information related to the substrate bonding process is provided in U.S. Pat. No. 7,172,921, issued on Feb. 6, 2007, and entitled "Method and Structure for Forming an Integrated Spatial Light Modulator," which is commonly assigned and is herein incorporated by reference for all purposes.

Substrate bonding can occur using a variety of techniques. In a specific embodiment, the bonding occurs using a room temperature covalent bonding process that results in the formation of a chemical bond at the bonding interface. Such low temperature bonding processes maintain the structural and electrical integrity of the CMOS semiconductor substrate 105. Each of the faces is cleaned and activated, e.g., by plasma activation or by wet processing. The activated surfaces are brought in contact with each other to cause a sticking action. In some bonding processes, mechanical force is provided on each substrate structure to press the faces together. In embodiments in which layer 240 is silicon and layer 220 is silicon oxide, silicon bearing bonds are created between the two faces. In alternative embodiments, an oxide layer is formed on the upper surface of layer 220 prior to bonding to provide an oxide-oxide bond interface. The upper surface of layer 220 is polished by a CMP process in one embodiment while the bonding surface of layer 240 is polished as well, providing an extremely smooth surface that is conducive to covalent bonding processes. According to embodiments of the present invention, no intermediate bonding material (e.g., epoxy) is utilized during the substrate bonding process. Of course, one of ordinary skill in the art would recognize many other variations, modifications, and alternatives.

According to embodiments of the present invention, bonding techniques are utilized that provide interfaces characterized by a bonded area/total area ratio of greater than 10%. For example, the bonded area, characterized by an adhesion test, is greater than 10% of the surface area of the upper surface of layer 220. In other embodiments, the bonded area/total area ratio is greater than 50%. In yet other embodiments, the bonded area/total area ratio is greater than 80%. The increase in bonded area as a function of the total interface area will result in a stronger mechanical connection between the torsion spring hinge layer and the support structures coupled to the substrate.

A cavity 246 is formed in between the two substrates during the bonding process. As described more fully throughout the present specification, the cavity 246, which was formed using a lithography and etching process during the process illustrated in FIG. 3B, provides space for rotation of the torsion spring hinge 116. Bias line 110a, which may be formed as the metal-4 layer of the CMOS substrate fabrication process, defines a lower bound of the cavity 246. The thickness of the oxide layer 220 minus the thickness of the metal-4 layer determines the height of the cavity. Accordingly, the distance from the lower side of substrate 240 to the bias line 110a defines a predetermined height. Additionally, the predetermined height may be defined with respect to a surface of layer 240 and another layer or surface of the CMOS substrate.

According to some embodiments, a thin SOI substrate is used with a direct implant process used during a portion of the substrate bonding and thinning process. In some embodiments, no epitaxial process is used, providing lower cost and better uniformity for the single crystal silicon layer. Moreover, reductions in bonding alignment tolerances as well as better mirror to electrode alignment are provided according to embodiments of the present invention. In particular, because the SOI substrate including single crystal silicon layer 240 is planar and does not include surface features that are aligned with particular surface features present on the substrate 105, bonding alignment tolerances are reduced. Furthermore, embodiments of the present invention provide a large bonding area defined by the upper surface of the oxide layer 220, resulting in higher yield than conventional processes.

As an optional process in fabricating device according to embodiments of the present invention, a conductive layer (not shown) is formed in contact with the upper surface of single crystal silicon layer 240, providing for electrical conductivity between the layer 240 and subsequently deposited layers described more fully below. In an embodiment, the conductive layer is a deposited layer fabricated using the same materials utilized to form via plugs 243 described below (i.e., metal materials). Thus, the conductive layer provides electrical conductivity between the via plugs and the mirror structure described more fully below. In a particular embodiment, the conductive layer is a titanium layer or other metal layer in contact with the single crystal silicon layer 240. As described more fully below with respect to FIG. 7A, the titanium layer may be removed over portions of the landing pads formed in subsequent processing steps.

Figure 3D:
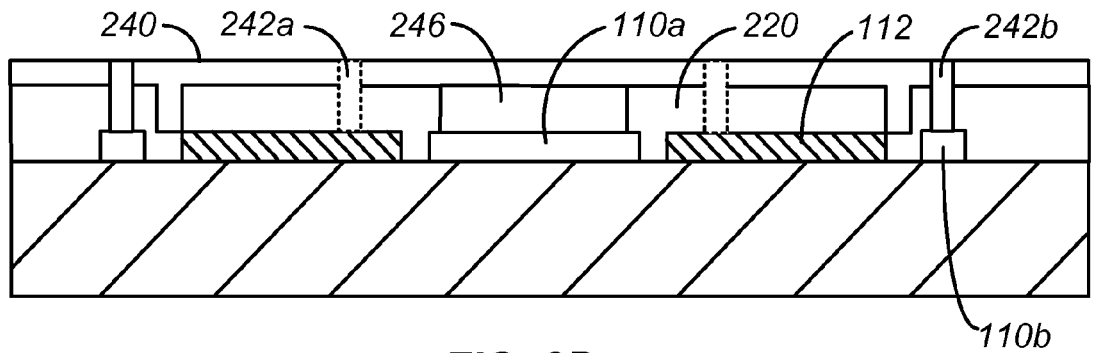

FIG. 3D illustrates a via etch process according to an embodiment of the present invention. As shown in FIG. 3D, vias 242a and 242b are etched to provide a path for electrical contact between various layers of the structure. For example, via 242a is a via providing an electrical connection between bottom electrode 112 and a silicon top electrode (not shown) that is fabricated in subsequent processing steps. Additionally, a bias via 242b is etched to make a contact path to the bias grid 110b. Additional description of the geometry and placement of the vias is provided below. Generally a two-step etch process is utilized to etch through the silicon layer 240 and the oxide layer 220, terminating on the upper surface of the metal layer forming the bottom electrode 112 and the bias grid 110b.

Figure 3E:
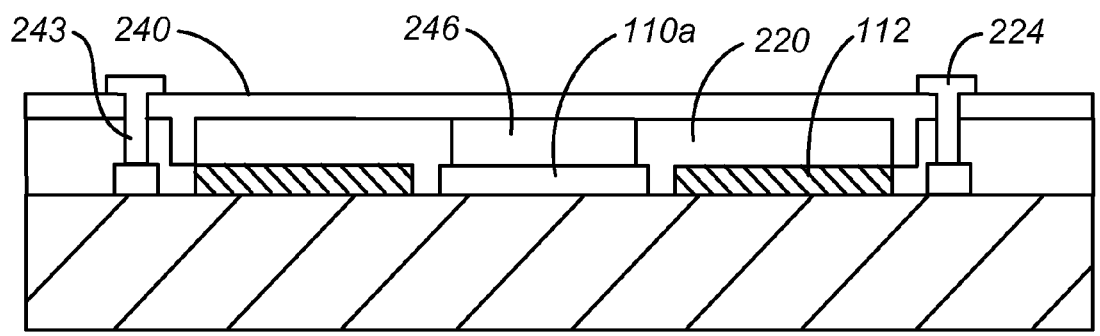

FIG. 3E illustrates the formation and patterning of via plugs 243 as well as an AR coating 224 according to an embodiment of the present invention. Vias formed during the process illustrated in FIG. 3D are filled using a via plug formation process that provides electrical connectivity between the bias layer 10a and the single crystal silicon layer 240. In some alternative embodiments of the present invention, a low temperature (less than 350° C.) chemical vapor deposition (CVD) process is utilized to deposit a conformal titanium layer that provides via step coverage and electrically connects the upper surface of the single crystal silicon layer 240 and the bias layer 110. In this alternative embodiment, the formation of the AR contact layer discussed below is modified, forming via plugs of dielectric material on the CVD Ti layer. One of ordinary skill in the art would recognize many variations, modifications, and alternatives.

AR coatings 224 are formed on portions of the structure, reducing the reflection of light passing by the sides of the micro-mirrors. Generally, the formation of AR coatings includes the deposition and patterning of dielectric layers of predetermined index of refraction and thickness. In some embodiments, the AR coating process is optional. One of ordinary skill in the art would recognize many variations, modifications, and alternatives.

Figure 3F:
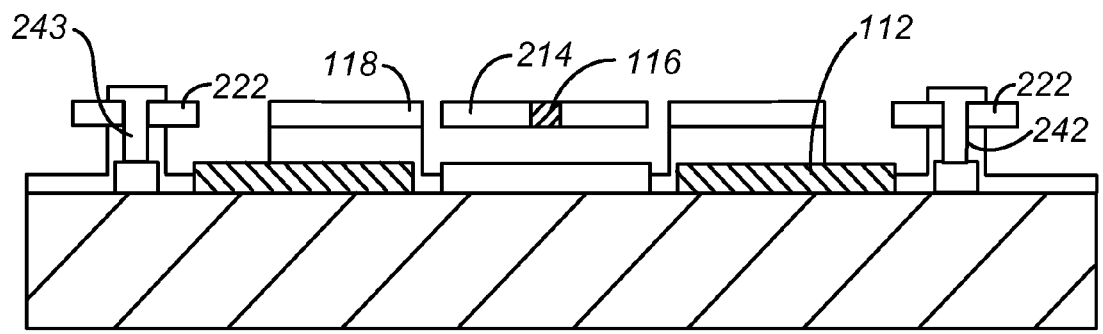

FIG. 3F illustrates the definition of the landing pads 222, the hinge 116, and the patterning of the step electrode. Single crystal silicon landing pads 222, hinge 116, and the upper electrodes 118 are masked using a lithography process and etched using a silicon etching process. According to embodiments of the present invention, the fabrication of the hinge from single crystal silicon provides numerous benefits, including high reliability. In embodiments in which the conformal CVD Ti layer is deposited in vias 242, a metal etch precedes the silicon etch process. Referring to FIG. 3F, in regions above the bottom electrode 112, both the single crystal silicon layer 240 and the HDP oxide 220 are removed, exposing the bottom electrode 112. As will be understood, an etch process is terminated using the metal layer as an endpoint is utilized in some embodiments. Of course, other removal processes are included within the scope of the present invention. As illustrated in FIG. 3F, in some embodiments, the landing pads, the hinge, and a top portion 118 of the stepped electrode are fabricated from silicon, for example, single crystal silicon layer 240.

In a particular embodiment of the present invention, the definition of the landing pads, the hinge, and the step electrodes are separated into two or more lithography/etch processes. For example, a hinge definition etch includes patterning using deep-ultraviolet (DUV) lithography that provides critical dimensions of about 0.18 μm while the landing pad and step electrode etch includes patterning using i-line lithography that provides critical dimensions of about 0.6 μm. Thus, although illustrated as a single process in FIG. 3F, multiple lithography and etching steps characterized by different resolutions are utilized in some embodiments to reduce processing costs while providing desired uniformity and control.

In some embodiments, as described more fully below, the landing pads 222 may be patterned to form notches or other shapes when viewed normal to the substrate 105 in order to increase the flexibility of the layer. The notches or other shapes will generally pass through the thickness of the landing pads and form portions extending from the central region in a cantilevered manner, thereby increasing the flexibility of the landing pads. The formation of notches or other recesses in the landing pads 222 may be performed during the lithographic steps described above or in a separate lithographic step.

Figure 3G:
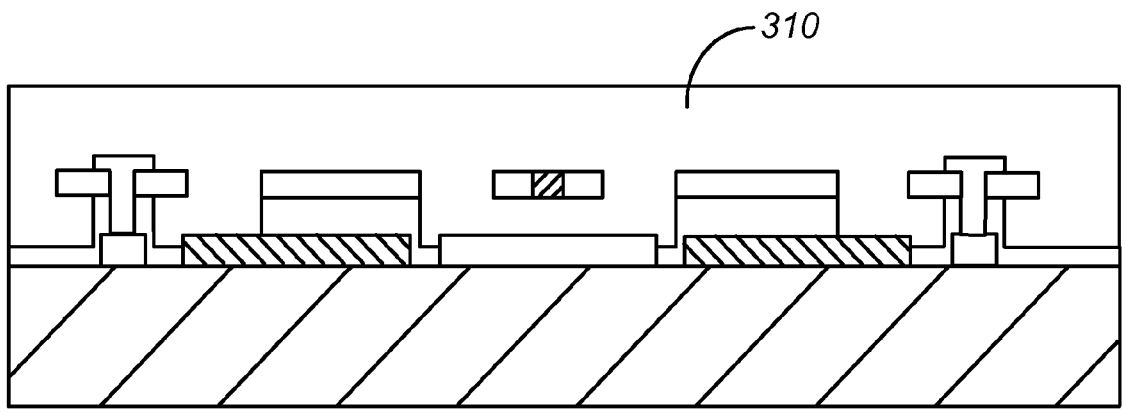

FIG. 3G illustrates the formation of a sacrificial layer 310 on the SLM substrate. The material used for layer 310 is sacrificial in the sense that it provides mechanical support for subsequently deposited and patterned layers and is then removed in other subsequent processing steps. In some embodiments, the material used to form sacrificial layer 310 is photoresist, although this is not required by the present invention. Planarization of the sacrificial layer is performed in some embodiments. Preferably, the substantially planarized surface of layer 310 is characterized by a waviness, defined as a peak to valley roughness, of less than 50 nm. As discussed more fully below, planarization of the upper surface of layer 310 enables the formation of a planar or substantially planar mirror plate in subsequent processing steps. In one embodiment, photoresist material is spun on the substrate with a first thickness. Partial exposure of the photoresist material using an exposure dose less than that needed to fully expose the photoresist material is performed. Accordingly, development of the partially exposed photoresist results in removal of an upper portion of the photoresist material, producing a sacrificial layer of a second thickness as illustrated in FIG. 3G. As illustrated in FIG. 3G, the sacrificial material coats and embeds the various components fabricated in previous processing steps.

Figure 3H:
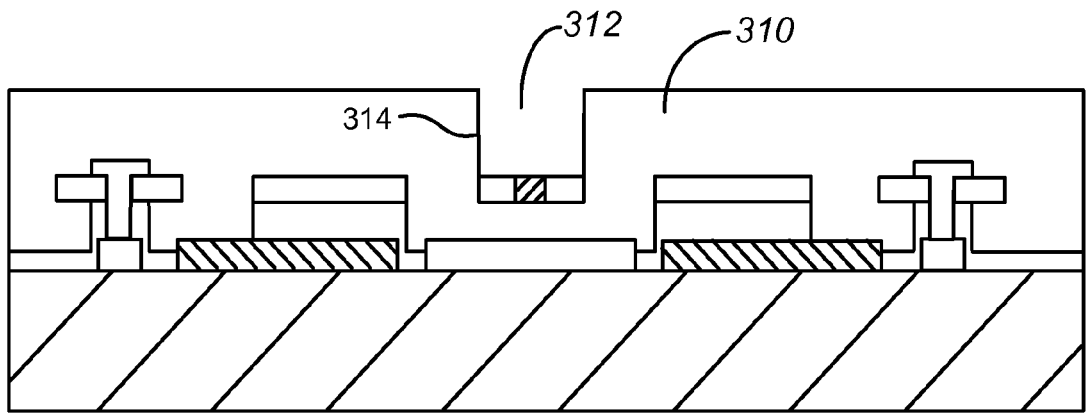

FIG. 3H illustrates the formation of a mirror post cavity adjacent to the torsion spring hinge according to an embodiment of the present invention. In some embodiments, the mirror post cavity is referred to as a mirror anchor cavity. A volume 312 is opened up in the sacrificial material 310 with the volume 312 vertically adjacent to the hinge. The geometry of the volume 312 is a predefined shape, providing a footprint for a mirror post that provides mechanical contact between the hinge and the mirror plate, described below. In the embodiment illustrated in FIG. 3H, the top view of the volume 312 is a square although this is not required by embodiments of the present invention. Generally, the tolerances for the definition of area 312 are such that and i-line lithography process is utilized with a critical dimension of about 1.0 μm. As illustrated in FIG. 3H, the side-walls 314 of the volume 312 are perpendicular to layer 240 from which the torsion spring hinge is fabricated. However, this is not required by the present invention. In some embodiments, the side-walls 314 are tilted at an angle to the vertical, enabling for step coverage of the side-walls during a PVD silicon deposition process described more fully below. One of ordinary skill in the art would recognize many variations, modifications, and alternatives.

Figure 3I:
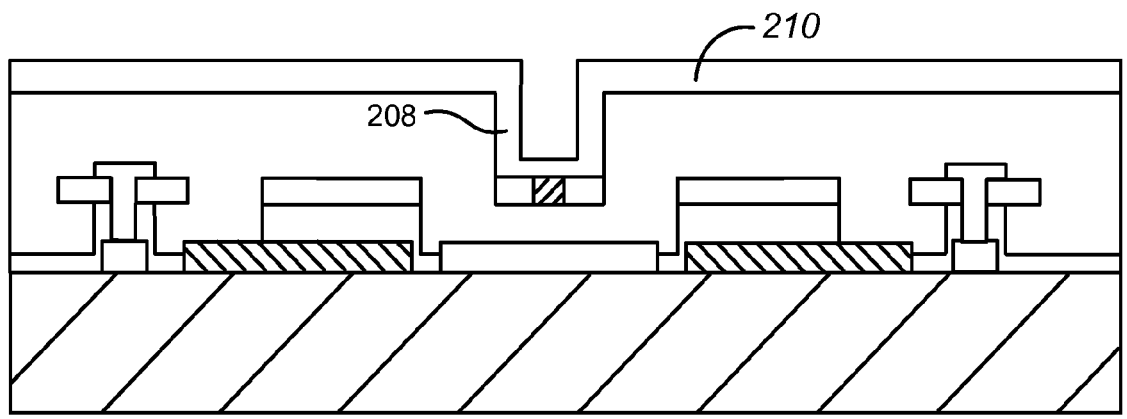

FIG. 3I illustrates the formation of a mirror structure including a mirror post 208 and a mirror plate 210 in contact with the hinge and the sacrificial material according to an embodiment of the present invention. In the embodiment illustrated in FIG. 3I, the layer from which the mirror post and the mirror plate are formed is deposited using an amorphous silicon deposition process, for example, a physical vapor deposition (PVD) process. In a particular embodiment, the PVD process is performed at a temperature of less than 300° C., although in other embodiments, the formation temperature is lower, for example, less than 200° C. or less than 100° C. As illustrated in FIG. 3I, the layer from which the mirror post and the mirror plate are formed is a conformal layer, although this is not required by the present invention. As discussed above, the cross-sectional profile of the mirror post is generally tapered to provide for step coverage that includes the side-walls of the mirror post. According to embodiments of the present invention, the single crystal silicon hinge material is joined to the amorphous silicon mirror post at the anchor position opened up by the process illustrated in FIG. 3H. Because the hinge and mirror structure are both silicon, the CTE of these materials is well matched, providing thermal benefits over conventional designs.

In some embodiments, an adhesion layer, such as a titanium layer, is formed on the upper surface of layer 240 after opening of cavity 312 and prior to formation of the mirror post 208. In these embodiments, the adhesion layer promotes the mechanical integrity of the mechanical bond formed between the hinge and the mirror post. One of ordinary skill in the art would recognize many variations, modifications, and alternatives.

Figure 3J:
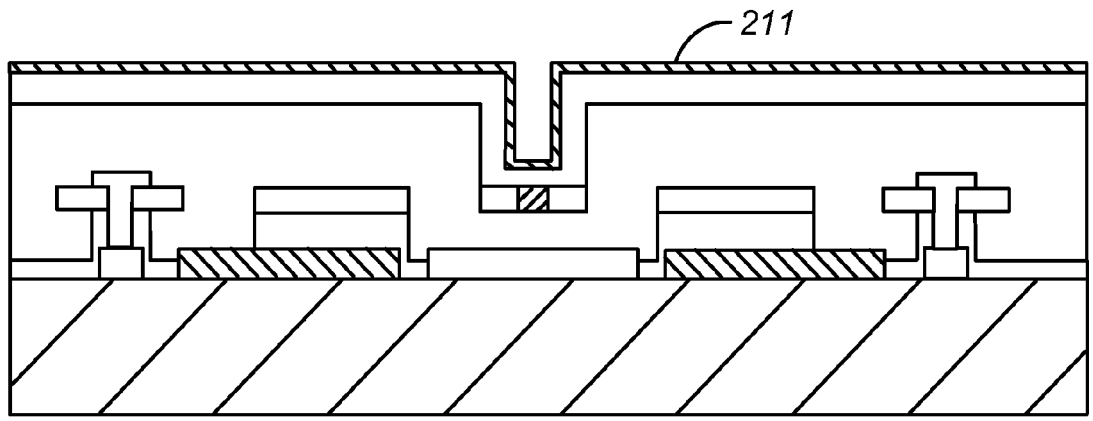

FIG. 3J illustrates the formation of a reflective layer on the mirror plate according to an embodiment of the present invention. In the embodiment illustrated in FIG. 3J, the reflective layer 211 is formed using a PVD process in which a Ti seed layer and an Al layer are deposited on the mirror plate layer. Preferably, the PVD process is performed a temperature of less than 100° C. In alternative embodiments, other reflective layers that adhere to the mirror layer are utilized. In some embodiments, the top surface of the mirror plate is polished to provide a reflective surface. In a particular embodiment, the top surface of the mirror plate is characterized by a surface roughness less than or equal to about 25 Å RMS. One of ordinary skill in the art would recognize many variations, modifications, and alternatives.

Figure 3K:
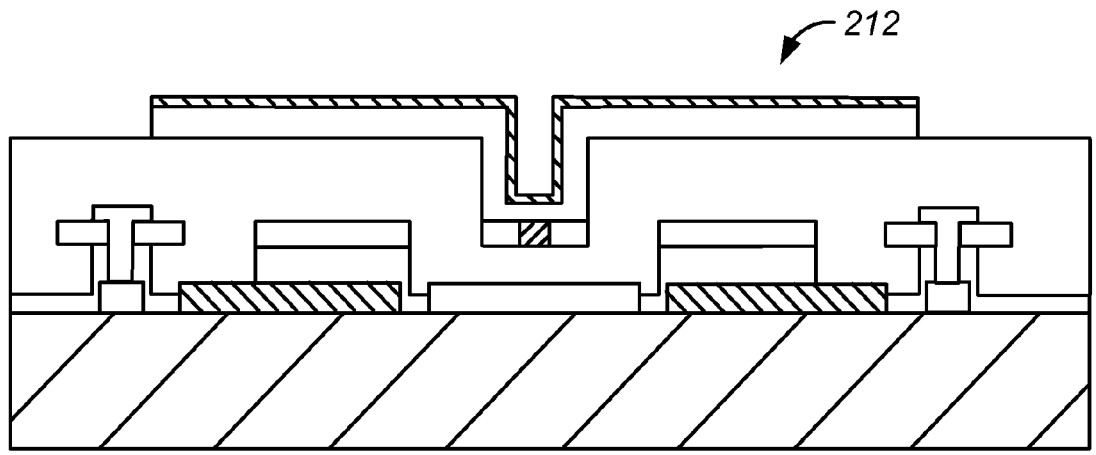

FIG. 3K illustrates a mirror patterning process according to an embodiment of the present invention. A lithography and etching process is utilized to selectively remove the Ti/Al layer 211 and the amorphous silicon layer 210 to form mirror 212. In one embodiment, the dimensions of the mirror are 15 μm×15 μm, whereas in another embodiment the dimensions of the mirror are 9.6 μm by 9.6 μm. In other embodiments, other dimensions are utilized as appropriate to the particular applications. As illustrated in FIG. 3K, the lateral dimensions of the landing pads and the mirror plate are selected so that the corners of the mirror overlie the landing pads. Thus, as shown in FIG. 2B, the deflection of the mirror plate in response to the electrode voltages will result in contact between the underside of the mirror plate and the landing pads when the mirror plate is in the activated states.

Depending on the height of the mirror post and the distance from the mirror plate to the silicon layer from which the landing pads are formed, the lateral overlap between the mirror plate and the landing pads will be selected to provide for contact in the activated state while still providing a high fill factor. Additionally, the lateral extension of the landing pads from the central region of the landing pads will influence the flexibility of the landing pads and thereby the restoring force provided by the deformation of the landing pads upon contact with the mirror plate.

Figure 3L:
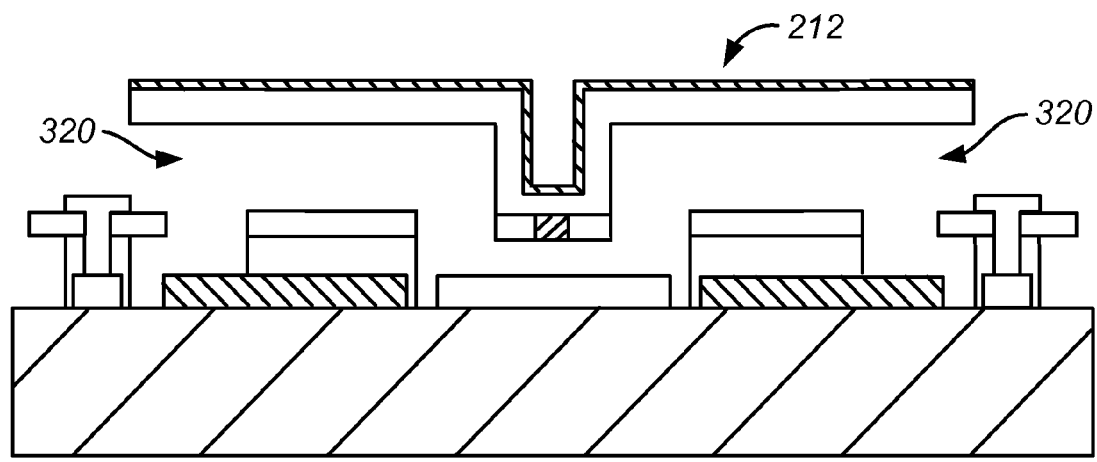

FIG. 3L illustrates a process step in which the sacrificial material is removed, freeing the mirror plate to rotate about the torsion spring hinge. In regions 320, the sacrificial material is removed, releasing the mirror. In some embodiments in which the sacrificial material is photoresist, a plasma ashing process is used to remove the photoresist, exposing the mirror and freeing the mirror to rotate under the influence of the electrodes and bias voltages.

According to embodiments of the present invention, SLMs are provided with mirrors in which the whole structure of mirror is silicon, or composites of silicon and other materials, not aluminum. The use of an all silicon mirror structure provides benefits including mirror structures with high mechanical strength, a high degree of flatness, and mechanical rigidity. Additionally, embodiments of the present invention use different forms of silicon for different parts of the mirror and hinge structure. In a specific embodiment, for example, the hinge and landing pads are fabricated from single crystal silicon as a result of the mechanical properties of single crystal silicon. In this specific embodiment, the mirror plate is fabricated from amorphous silicon so that the mirror plate does not flex significantly since amorphous silicon is strong, flat, and rigid. Additionally, in this specific embodiment, the CTE of the mirror structure and the hinge are well matched.

As described more fully throughout the present specification, the materials used in the fabrication of mirror post 208 and mirror plate 210 are not limited to amorphous silicon, but a wide variety of materials may be used. Other suitable materials for the mirror post and the mirror plate include polysilicon, silicon metal alloys (e.g., silicon/aluminum), metal, (e.g., tungsten, titanium, titanium nitride), combinations of these materials, and the like.

The process flow illustrated in FIGS. 3A-3L provides a baseline design for the fabrication of an SLM. Alternative embodiments modify and change portions of the baseline design while still providing SLMs and micro-mirrors within the scope of the present invention. The process flow discussed above is merely an exemplary process for fabricating an SLM and is not intended to limit embodiments of the present invention. In alternative embodiments, the number of steps, the order of the steps, and the lengths of the various steps are modified depending on the particular application. Other alternatives can also be provided where steps are added, one or more steps are removed, or one or more steps are provided in a different sequence without departing from the scope of the claims herein. Further details of suitable process flows can be found throughout the present specification and more particularly below.

In a particular embodiment of the present invention, a method of fabricating an optical deflection device is provided. The method includes providing a substrate, for example, a CMOS substrate including a number of electrode devices. Additionally, the substrate may include a number of electrode drivers, a pulse width modulation array, and other suitable electronic circuitry associated with the electrode devices. In an embodiment, the electrode devices are disposed to form a multi-dimensional array pattern associated with pixels of the optical deflection device. The method also includes forming a substantially planarized dielectric layer over the substrate. In a specific embodiment, forming the substantially planarized dielectric layer includes depositing an oxide layer using an HDP process and planarizing the deposited oxide layer using a CMP or other planarizing process. One of ordinary skill in the art would recognize many variations, modifications, and alternatives.

In some embodiments, the process of depositing an oxide layer is performed at a temperature less than a temperature associated with a state change of an underlying material, such as the CMOS circuitry, for example the electrode devices. The temperature of the oxide deposition process is preferably less than an aluminum reflow temperature, which is about 450° C. In another embodiment, the process of depositing an oxide layer is performed at a temperature less than a temperature less than a glass transition temperature of photoresist, which is about 150° C.

The method further includes forming a cavity in the planarized dielectric layer. In some embodiments, the cavity is formed by an etching process that removes a predetermined amount of the planarized dielectric layer. The cavity provides a rotation space for a torsion spring hinge. A layer transfer process is performed to bond a silicon layer (e.g., a single crystal silicon layer of an SOI substrate) to the planarized dielectric layer. The layer transfer process generally includes a substrate bonding process that provides a covalent bond between the planarized dielectric layer and the single crystal silicon layer. In particular embodiments, the substrate bonding process utilizes an SOI substrate, various layers of which are removed to provide the single crystal silicon layer.

Moreover, the method includes forming a hinge and a plurality of landing pads from the silicon layer. A photolithography patterning and etching process is used to form the landing pads and the hinge in some embodiments. A planarized material layer coupled to the hinge is formed out of photoresist in some embodiments and a cavity is formed in the planarized material layer. The cross-sectional profile of the cavity is generally tapered, with a larger area at the top of the cavity than at the bottom of the cavity. Utilizing such a tapered cavity, PVD processes provide a layer of continuous material in subsequent deposition processes. A mirror structure including a mirror post and a mirror plate is formed by filling at filling at least a portion of the cavity. The mirror structure is released by removing the planarized material layer, generally using an oxygen plasma ashing process to remove the photoresist layer.

According to some embodiments, the mirror structure is formed using silicon materials or composites of silicon and other materials. In particular, an amorphous silicon layer is deposited and planarized at a temperature of less than 150° C. to form the mirror post and the mirror plate. In other embodiments, the mirror structure is fabricated using polysilicon, silicon/metal alloys such as silicon/Al alloys, combinations of these materials, and the like. As an optional fabrication process, a mirror coating layer, for example, a Ti/Al layer, coupled to the mirror structure is formed to increase the reflectivity of the mirror structure, which is desirable for display applications.

Figure 4:
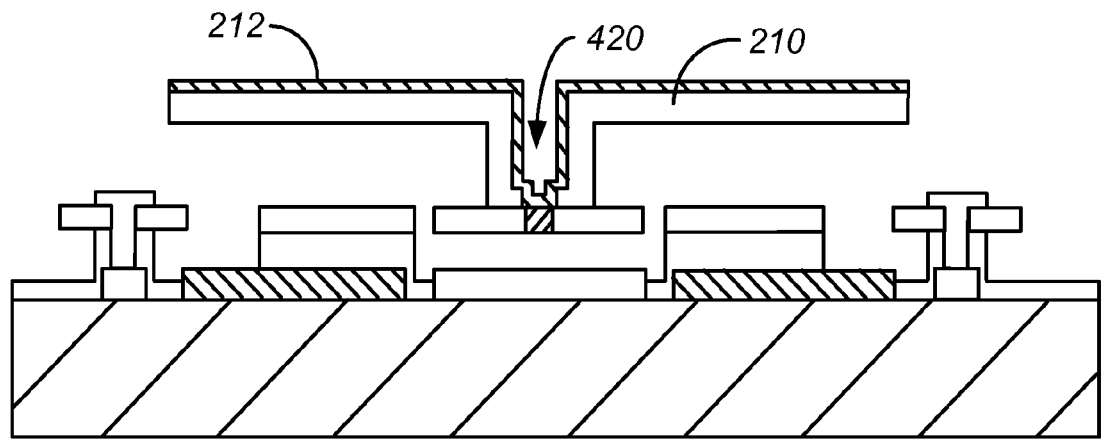
FIG. 4 is a simplified cross-sectional view of a high fill ratio mirror for an SLM according to another embodiment of the present invention.

FIG. 4 illustrates a mirror release process according to an embodiment of the present invention. As illustrated in FIG. 4, the amorphous silicon mirror layer 210 and the reflective/conductive layer 212 are patterned and etched to form the illustrated mirror structure. As illustrated by reference number 420, electrical contact between the single crystal silicon hinge and the reflective/conductive layer is provided. In a manner similar to that discussed previously, sacrificial material initially supporting the mirror post and the mirror plate is removed during the mirror release process. As in other designs provided by embodiments of the present invention, the mirror plate formed from mirror layer 210 laterally overlaps the landing pads.

Figure 5:
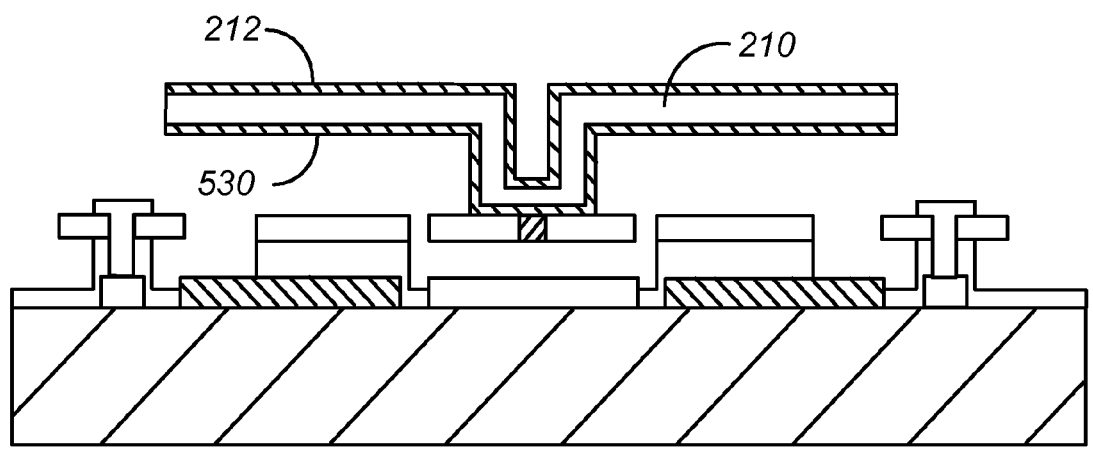
FIG. 5 is a simplified cross-sectional view of a high fill ratio mirror for an SLM according to an alternative embodiment of the present invention.

In the alternative embodiment illustrated by FIG. 5, electrically conductive and reflective layer 530 is formed prior to deposition of the amorphous silicon layer 210. Referring to FIGS. 3H and 3I, the PVD formation of layer 530 may be performed after the opening of aperture 312 and prior to the deposition of amorphous silicon layer 210, thereby inserting a metal deposition process in the process flow. In some embodiments, a composite Ti/Al metal layer is formed as discussed above. Amorphous silicon layer 210 is formed as discussed above, as well as a top metal layer 212. Electrical contact is provided by the contact between the single crystal silicon hinge and layer 530. Thus, both electrical conductivity and optical reflection functions are performed by layers 530 and 212. As will be evident to one of skill in the art, many of the previous processing steps may be utilized to fabricate the structure illustrated in FIG. 5, including a mirror release process.

In the embodiment illustrated in FIG. 5, the bottom metal layer 530 serves as a mirror electrode, thereby reducing the operating voltages. Additionally, coating of the bottom of the mirror plate with a metal or semiconductor/metal alloy layer may increase the durability of the mirror plate with respect to contact with the landing pads. In some embodiments, the sacrificial layer is patterned with recessed regions extending toward the substrate. Accordingly, deposition of the bottom metal layer 530 results in the formation of protrusions extending toward the substrate, providing contact pads on the metal layer that increase durability and potentially reduce stiction forces further. One of ordinary skill in the art would recognize many variations, modifications, and alternatives.

Figure 6:
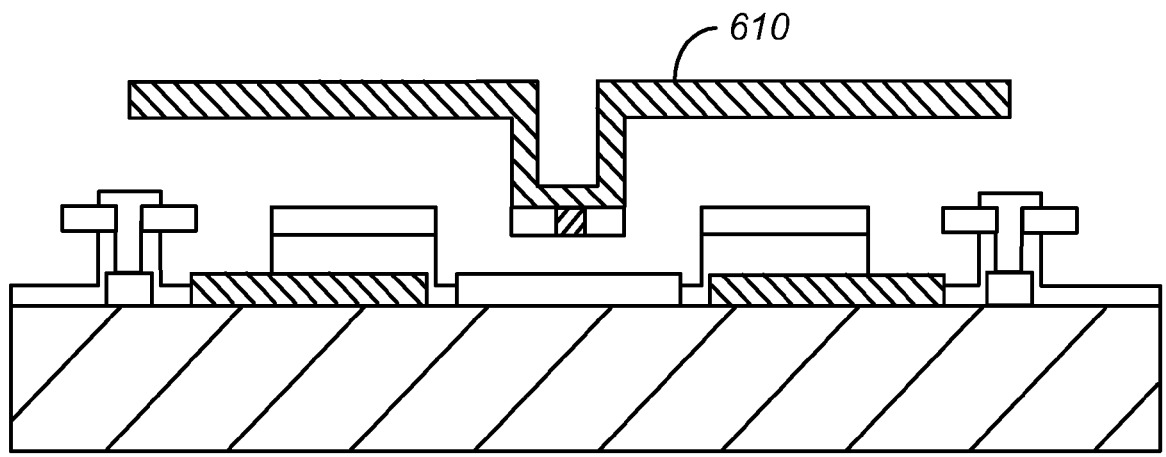
FIG. 6 illustrates a simplified cross section view of a silicon/Al alloy mirror according to an embodiment of the present invention.

FIG. 6 illustrates a simplified cross section view of a silicon/Al alloy mirror according to an embodiment of the present invention. As illustrated in FIG. 6, the amorphous silicon mirror layer is replaced by a silicon/Al alloy layer 610 that is both conductive and reflective. Referring to FIGS. 3I and 3J, the silicon/Al alloy mirror layer 610 is fabricated in place of the layers illustrated in those figures. As will be evident to one of skill in the art, many of the previous processing steps may be utilized to fabricate the structure illustrated in FIG. 6, including a mirror release process.

Figure 7A:
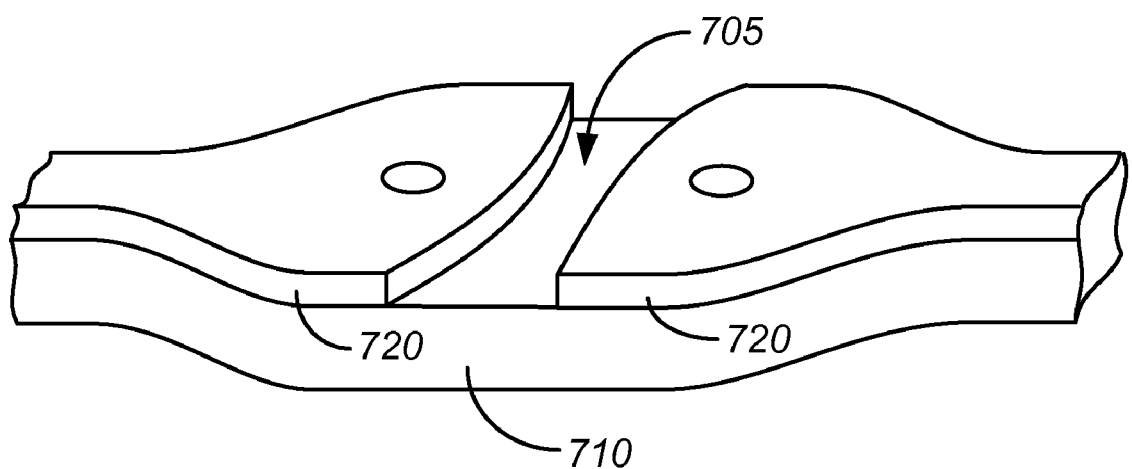
FIG. 7A is a simplified perspective view of a portion of a landing pad according to an embodiment of the present invention.

FIG. 7A is a simplified perspective view of a portion of a landing pad according to an embodiment of the present invention. The landing pad includes a region 705 in the center of the landing pad where the silicon layer 710 is exposed. On outer portions of the landing pad, the top surface is formed by a titanium layer 720. Contact between the corner of the mirror plate and the landing pad thus occurs in the central region 705 in which the mirror plate makes contact with the silicon layer 710, which may be a single crystal silicon layer in some embodiments. The shape of the region 705, sometimes referred to as a "clear out zone" is determined by the particular application, with a generally hour-glass shape when viewed from the top. In a particular embodiment, the titanium layer 720 is not completely removed in the clear out zone, providing a reduced height in region 705 in comparison to the outer portions of the landing pad.

As illustrated in FIG. 7A, the edges of the landing pads are chamfered in some embodiments. Thus, although not illustrated in FIG. 1A for purposes of clarity, tapering of the landing pads as the silicon layer transitions to the hinge region is provided herein. The chamfering of the silicon layer provides for control over the torsion characteristics of the torsion spring hinge as well as over the mechanical properties of the landing pads. One of ordinary skill in the art would recognize many variations, modifications, and alternatives.

Figure 7B:
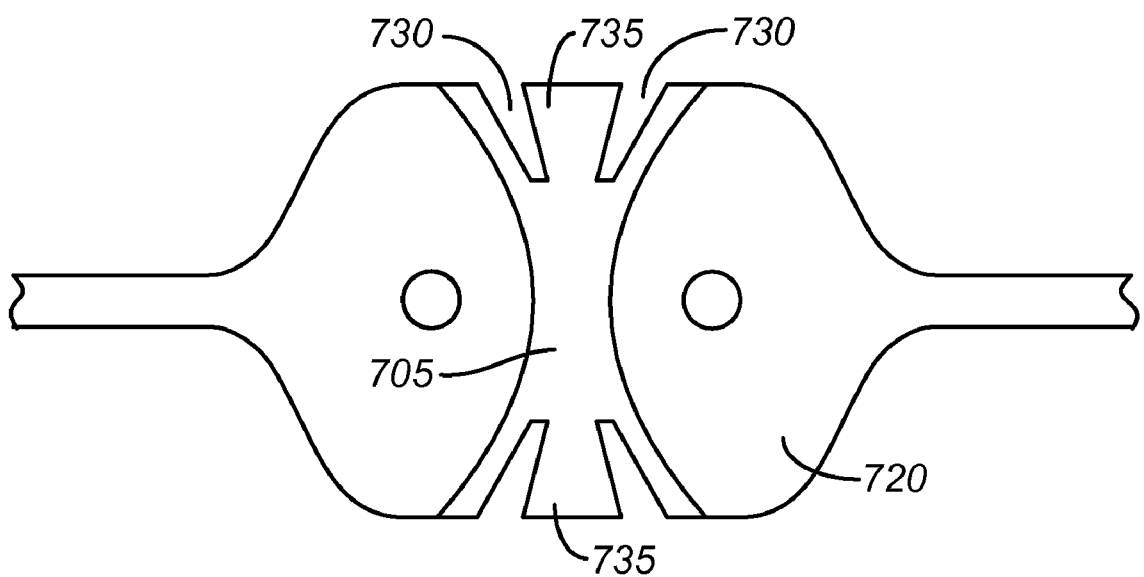
FIG. 7B is a simplified top view of a portion of a landing pad with notches according to an embodiment of the present invention.

FIG. 7B is a simplified top view of a portion of a landing pad with notches according to an embodiment of the present invention. The central region 705 includes two notches 730 on each side of the landing pads that form extension sections 735. The notches 730 extend a predetermined distance toward the central area of the landing pads, thereby increasing the flexibility of the silicon layer 710. In alternative embodiments according to the present invention, the effective flexibility of layer 710 is increased by increasing the depth of the notches or the width of the notches. In yet other alternative embodiments according to the present invention, the notches are formed using a multi-segment path or a varying width as a function of the notch depth. In an embodiment according to the present invention, the landing pads are formed from an elastic material, which is substantially restored to its original shape after distortion. As described above, the flexibility and elasticity of the extension section 735 is utilized to counteract one or more parasitic forces.

Figure 8:
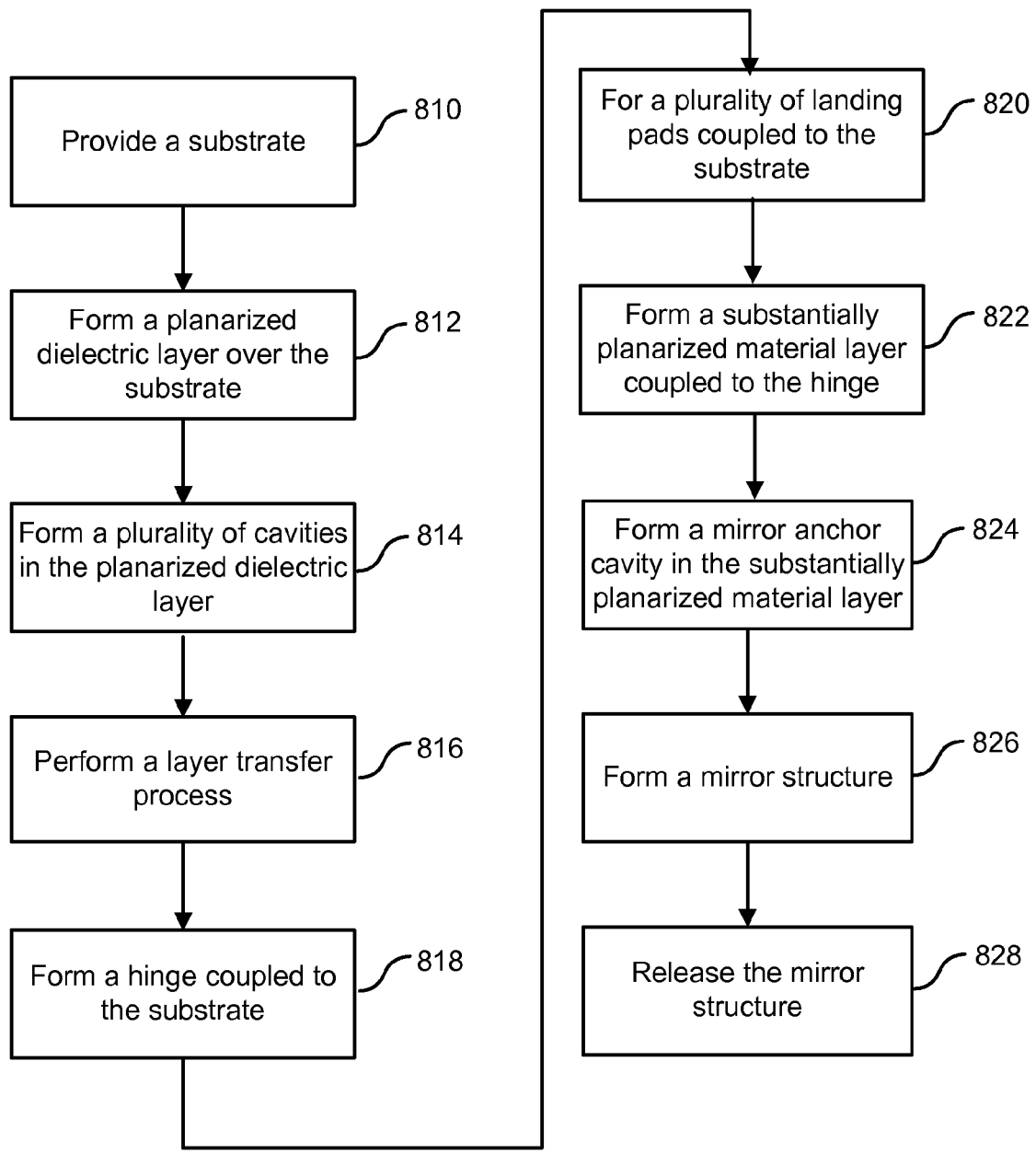
FIG. 8 is a simplified flowchart illustrating a process of fabricating an optical deflection device according to an embodiment of the present invention.

FIG. 8 is a simplified flowchart illustrating a process of fabricating an optical deflection device according to an embodiment of the present invention. The method includes providing a substrate (810), for example, a CMOS substrate, and forming a planarized dielectric layer over the substrate (812). In an embodiment, the planarized dielectric layer is an oxide or nitride layer that is deposited and then planarized using a CMP process. The planarized dielectric layer is characterized by a surface roughness value suitable for substrate bonding processes as described more fully throughout the present specification. The method also includes forming a plurality of cavities in the planarized dielectric layer (814). The plurality of cavities include a first cavity associated with a hinge formed in a subsequent processing step and a second set of cavities associated with a plurality of landing pads also formed in subsequent processing steps.

The method further includes performing a layer transfer process to bond a silicon layer to the planarized dielectric layer (816). Generally, the layer transfer process, which may be a substrate bonding process, results in a single crystal silicon layer being bonded to the planarized dielectric layer. The silicon layer provides a material layer from which a hinge and a plurality of landing pads are formed (818 and 820). As will be evident to one of skill in the art, the formation of the hinge and the plurality of landing pads is performed using masking, etching, and other suitable processes. In some embodiments, one or more processing steps are utilized to form one or more recesses passing through a thickness of the plurality of landing pads. As described above in relation to FIG. 7B, such notches provide for portions of the landing pads with increased flexibility as appropriate to the particular application. In various embodiments, the width and the depth of the recesses or notches can be varied to provide various shapes for the flexible landing pads. Moreover, in a particular embodiment, the recesses pass completely through the thickness of the landing pad in a first region and then only partially through the thickness of the landing pad in a second region. One of ordinary skill in the art would recognize many variations, modifications, and alternatives.

The method additionally includes forming a substantially planarized material layer coupled to the hinge (822). In a particular embodiment, the material layer is fabricated using photoresist. The material layer is planarized in order to provide a surface for formation of a mirror plate in subsequent processing steps. Since the material layer provides support for a lower portion or surface of the mirror plate, the planarization utilized at this stage of fabrication may be characterized by reduced tolerances in comparison with other planarization steps described herein.

After a mirror anchor cavity is formed in the substantially planarized material layer (824), a mirror structure is formed (826), thereby filling at least a portion of the mirror anchor cavity, and the mirror structure is released (828) according to the method. Generally, embodiments of the present invention utilize silicon material in the mirror structure although this is not required by the present invention. Merely by way of example, the silicon material may include an amorphous silicon layer, a polysilicon layer, or a silicon/metal alloy. Reflective surfaces may be added to the mirror plate in some embodiments as appropriate to the particular applications.

The above sequence of steps provides a method for fabricating an optical deflection device such as an SLM according to an embodiment of the present invention. As shown, the method uses a combination of steps including a way of forming movable micro-mirror structures. Other alternatives can also be provided where steps are added, one or more steps are removed, or one or more steps are provided in a different sequence without departing from the scope of the claims herein. Further details of the present method can be found throughout the present specification.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An optical deflection device for a display application, the optical deflection device comprising:
a semiconductor substrate comprising an upper surface region defining an upper surface plane;
one or more electrode devices provided overlying the upper surface region;
a hinge device comprising a silicon material and having an axis of rotation substantially parallel to the upper surface plane, wherein the axis of rotation is located at a predetermined height above the upper surface plane;
a plurality of landing pads comprising a silicon material and coupled to the upper surface region, wherein the plurality of landing pads are located at the predetermined height above the upper surface plane; and
a mirror structure comprising:
a post portion coupled to the hinge device, and
a mirror plate portion coupled to the post portion.

2. The optical deflection device of claim 1 wherein a lower side of the mirror plate portion is configured to make contact with one of the plurality of landing pads in a first activated position.

3. The optical deflection device of claim 2 wherein the lower side of the mirror plate portion comprises a corner region of the mirror plate portion.

4. The optical deflection device of claim 2 wherein a lower side of the mirror plate portion is configured to make contact with another of the plurality of landing pads in a second activated position.

5. The optical deflection device of claim 2 wherein the one of the plurality of landing pads deforms in response to the contact.

6. The optical deflection device of claim 1 wherein a thickness of the hinge device and a thickness of the plurality of landing pads are defined by a same thickness.

7. The optical deflection device of claim 1 wherein the silicon material comprises single crystal silicon.

8. The optical deflection device of claim 1 wherein the semiconductor substrate comprises a CMOS substrate.

9. The optical deflection device of claim 1 wherein the mirror structure comprises a silicon material.

10. The optical deflection device of claim 9 wherein the silicon material of the mirror structure comprises at least one of amorphous silicon, a polysilicon, or a silicon/metal alloy.

11. An array of optical deflection devices for a display application, the array of optical deflection devices comprising:
   a semiconductor substrate comprising an upper surface region defining an upper surface plane;
   a plurality of sets of electrode devices arrayed over the upper surface region;
   a plurality of hinge devices, each of the plurality of hinge devices being associated with a set of electrode devices, wherein each of the plurality of hinge devices comprises a silicon material coupled to the upper surface region and has an axis of rotation substantially parallel to the upper surface plane, wherein the axis of rotation is positioned at a predetermined height above the upper surface plane;
   a plurality of mirror structures, each of the plurality of mirror structures being joined to one of the plurality of hinge devices, wherein each of the plurality of mirror structures comprises:
      a mirror anchor portion coupled to the one of the plurality of hinge devices, and
      a mirror plate portion coupled to the mirror anchor portion; and
   a plurality of sets of landing pads, each of the sets of landing pads being associated with one of the plurality of mirror structures, wherein each of the sets of landing pads comprises a silicon material and is coupled to the upper surface region, wherein each of the sets of landing pads is located at the predetermined height above the upper surface plane.

12. The array of optical deflection devices of claim 11 wherein a lower side of the mirror plate portion is configured to make contact with a portion of a landing pad of the set of landing pads in a first activated position.

13. The array of optical deflection devices of claim 12 wherein the lower side of the mirror plate portion comprises a corner region of the mirror plate portion.

14. The array of optical deflection devices of claim 11 wherein the silicon material comprises single crystal silicon.

15. The array of optical deflection devices of claim 11 wherein the semiconductor substrate comprises a CMOS substrate.

16. The array of optical deflection devices of claim 11 wherein the mirror structure comprises a silicon material.

17. The array of optical deflection devices of claim 16 wherein the silicon material of the mirror structure comprises at least one of amorphous silicon, a polysilicon, or a silicon/metal alloy.

* * * * *